US007813643B2

(12) United States Patent
Chen

(10) Patent No.: US 7,813,643 B2
(45) Date of Patent: Oct. 12, 2010

(54) PORTABLE ELECTRONIC APPARATUS HAVING REMOTE CONTROL MODULE

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 552 days.

(21) Appl. No.: 11/849,118

(22) Filed: Aug. 31, 2007

(65) Prior Publication Data

US 2008/0131131 A1 Jun. 5, 2008

(30) Foreign Application Priority Data

Dec. 1, 2006 (CN) ........................ 2006 1 0157218

(51) Int. Cl.
*H04B 10/22* (2006.01)

(52) U.S. Cl. ....................................... 398/106; 399/212

(58) Field of Classification Search ................. 398/106, 398/212

See application file for complete search history.

(56) References Cited

U.S. PATENT DOCUMENTS

| | | | | |
|---|---|---|---|---|
| 6,908,235 | B2 * | 6/2005 | Kuhara | 385/88 |
| 7,368,716 | B2 * | 5/2008 | Chen | 250/339.01 |
| 2006/0248715 | A1 * | 11/2006 | Hanada et al. | 29/841 |
| 2008/0068207 | A1 * | 3/2008 | Elberbaum | 340/825.72 |
| 2009/0226176 | A1 * | 9/2009 | Franklin | 398/115 |

FOREIGN PATENT DOCUMENTS

| | | | |
|---|---|---|---|
| CN | 2651787 | Y | 10/2004 |
| JP | 9-53993 | A | 2/1997 |
| JP | 2002-16677 | A | 1/2002 |
| JP | 2006-71999 | A | 3/2006 |
| JP | 2006-287297 | A | 10/2006 |
| JP | 2006303867 | * | 11/2006 |

* cited by examiner

*Primary Examiner*—Leslie Pascal
(74) *Attorney, Agent, or Firm*—Jeffrey T. Knapp

(57) ABSTRACT

An exemplary portable electronic apparatus having a remote control module is provided. The portable electronic apparatus includes a housing, a mobile communication module disposed in the housing, a remote control module disposed in the housing, and a radio frequency (RF) module electrically connected with the mobile communication module. The remote control module includes an infrared sensing module and a digital signal processing (DSP) module electrically connected with the infrared sensing module and the RF module. The RF module is configured for receiving external RF signals and transmitting information received from said mobile communication module and said DSP module with RF signals. The portable electronic apparatus can be used for infrared remote control and mobile communication.

18 Claims, 1 Drawing Sheet

PORTABLE ELECTRONIC APPARATUS HAVING REMOTE CONTROL MODULE

BACKGROUND

1. Technical Field

The present invention relates generally to the field of electronic products, and more particularly, to a remote control module and a portable electronic apparatus having the same.

2. Description of the Related Art

Electronic gaming has been popular in recent years. In a typical electronic gaming machine, a remote control module is connected to a main unit of the electronic gaming machine by a cable. The remote control module generally includes a control panel with several buttons and joysticks thereon. When playing a game, a user presses the buttons or moves the joysticks to remotely control the main unit of the electronic gaming machine. However, after frequent use of the buttons and the joysticks, the mechanical parts therein tend to get worn out, thus degrading the precision of the remote control and the gaming experience of the user.

On the other hand, cell phones have been widely used by consumers for many years. A typical cell phone generally includes a keypad. A user presses buttons on the keypad to dial a phone number. However, in some emergency situations, it is not convenient or even possible to press the buttons.

Therefore, what is needed is to provide a remote control module and a portable electronic apparatus having the same which can reliably achieve precise remote control and dialing phone numbers without using a keypad.

SUMMARY

A remote control module, in accordance with a preferred embodiment, is provided. The remote control module includes an infrared sensing module and a digital signal processing (DSP) module electrically connected with the infrared sensing module. The infrared sensing module includes a barrel having a light entrance opening, an infrared sensor disposed in the barrel, and at least one optical element disposed between the light entrance opening and the infrared sensor. The at least one optical element includes at least one infrared pass filter. The DSP module is configured (i.e., structured and arranged) for processing signals received from the infrared sensor and transmitting signals corresponding to the result of such processing.

A portable electronic apparatus, in accordance with another preferred embodiment, is provided. The portable electronic apparatus includes a housing, a mobile communication module disposed in the housing, a remote control module disposed in the housing, and a radio frequency (RF) module electrically connected with the mobile communication module. The remote control module includes an infrared sensing module and a digital signal processing (DSP) module electrically connected with the infrared sensing module and to the RF module. The infrared sensing module includes a barrel having a light entrance opening, an infrared sensor disposed in the barrel, and at least one optical element disposed between the light entrance opening and the infrared sensor. The at least one optical element includes at least one infrared pass filter. The DSP module is configured (i.e., structured or arranged) for processing signals received from said infrared sensor and transmitting signals corresponding to the result of said processing to the RF module. The RF module is configured for receiving external RF signals and transmitting information received from said mobile communication module and said DSP module in RF signals.

BRIEF DESCRIPTION OF THE DRAWING

Many aspects of the present remote control module and portable electronic apparatus can be better understood with reference to the following drawing. The components in the drawing are not necessarily drawn to scale, the emphasis instead being placed upon clearly illustrating the principles of the present remote control module and portable electronic apparatus.

DETAILED DESCRIPTION OF THE EMBODIMENT

Figure 1:
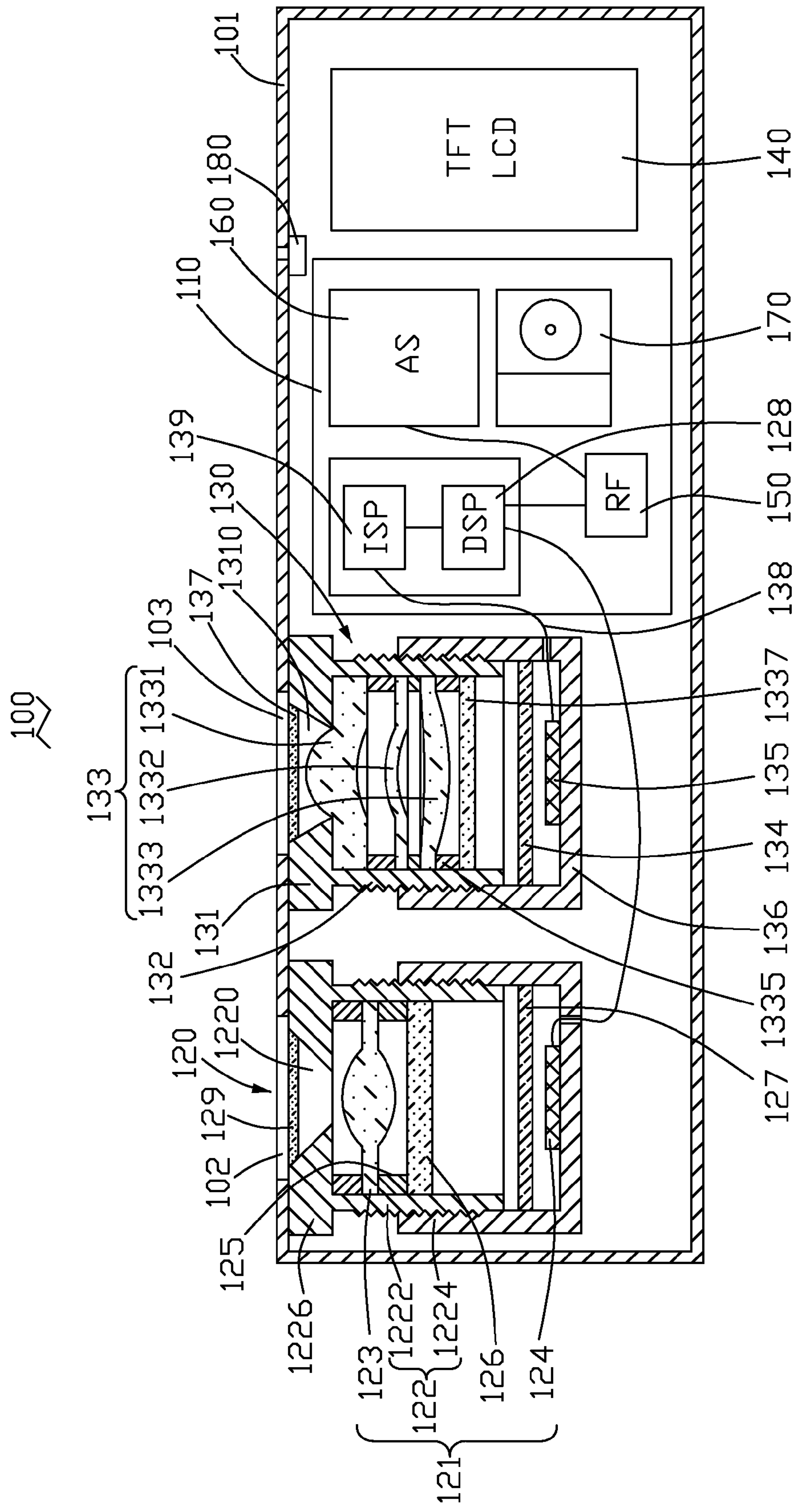
FIG. 1 is a block functional diagram of a portable electronic apparatus in accordance with a preferred embodiment.

Referring to FIG. 1, a portable electronic apparatus 100 having a remote control module, in accordance with a preferred embodiment, is provided. The portable electronic apparatus 100 includes a housing 101, a mobile communication module 110, a remote control module 120, a camera module 130, a display module 140, a RF module 150 electrically connected with the mobile communication module 110, and a multi-axial acceleration sensor 160 integrated with the mobile communication module. The mobile communication module 110, the remote control module 120, the camera module 130, the display module 140, the RF module 150 and the multi-axial acceleration sensor 160 are all disposed in the housing 101.

An infrared window 102 and a camera window 103 are defined on the housing 101, respectively corresponding to the remote control module 120 and the camera module 130. The infrared window 102 and the camera window 103 can be defined in a same side of the housing 101 (as shown in FIG. 1), or alternatively, can be defined on opposing or neighboring sides of the housing 101, depending on the allocation of the control module 120 and the camera module 130. A display window (not shown) is defined in the housing 101 at a location facing toward the display module 140. Preferably, the housing 101 is made of elastic materials such as synthetic rubber, acrylonitrile butadiene styrene (ABS) or other synthetic materials. When the portable electronic apparatus 100 experiences a large impulse, these elastic materials will reduce the impact upon the portable electronic apparatus 100 and protect it from damage.

The mobile communication module 110 is fixed inside the housing 101, on which signal processing circuits are configured for processing the signals that the mobile communication module 110 receives. The RF module 150 is integrated with the mobile communication module 110 for receiving and transmitting RF signals. Preferably, a blue tooth module is integrated in the RF module 150 for working with the RF module 150 to wirelessly receive and transmit signals.

The remote control module 120 includes an infrared sensing module 121 and a digital signal processing (DSP) module 128 electrically connected thereto. The infrared sensing module includes a barrel 122, wherein an optical lens 123, an infrared sensor 124, and an infrared pass filter 126 are disposed.

The barrel 122 includes a barrel body 1222 and a barrel seating 1224 engaged therewith. A barrel lid 1226 is disposed on the top of the barrel body 1222 near the infrared window 102. The barrel body 1222 is threadedly engaged with the barrel seating 1224. The barrel lid 1226 is ring-shaped, and defines an essentially round-shaped light entrance opening 1220 confined therein for allowing infrared light to be received in the barrel 122. Preferably, an infrared lens 129 is disposed in the light path of the light coming into the light entrance opening 1220 for passing only infrared light and blocking light in other spectrums. The infrared lens 129 also serves to prevent dusts and dirt outside from getting into the barrel 122. It is understood that the infrared lens 129 can alternatively be disposed in the infrared window 102.

The infrared sensor 124 is disposed in the barrel seating 1224, which can be a CMOS (complementary metal-oxide semiconductor) sensor or a CCD (charge coupled device) sensor configured for sensing light only in the infrared spectrum.

The infrared pass filter 126 is disposed inside the barrel 1222 between the infrared sensor 123 and the light entrance opening 1220. The infrared pass filter 126 includes a transparent substrate and multiple layers of oxide film with different refractive indexes formed thereon, passing infrared light and blocking light in other spectrums. By preventing light in other spectrums from disturbing the infrared light reception on the infrared sensor 124, the accuracy of infrared sensing is improved and so is the precision of the remote control. Preferably, the infrared pass filter 126 is formed by alternately depositing titanium oxide and silicon oxide films on the transparent substrate. The number of the layers is 30 to 50. It is understood that the multiple layers of films can be deposited directly on the optical lens 123 without using the transparent substrate.

The optical lens 123 is disposed between the infrared pass filter 126 and the light entrance opening 1220. A spacer ring 125 is disposed between the infrared pass filter 126 and the optical lens 123. Preferably, the optical lens 123 is a convex lens for focusing an image on the infrared sensor 124. It is understood that the number of optical lens 123 is not limited to one. Multiple lenses can be configured to improve the accuracy of optical signal reception.

The DSP module 128 is configured for processing signals received from said infrared sensor 124 and transmitting signals corresponding to the result of said processing to the RF module 150. Preferably, the DSP module 128 is integrated to the mobile communication module 110 and electrically connected with the RF module 150.

Preferably, the remote control module 120 further includes a glass sheet 127, disposed in the barrel seating 1224 between the barrel body 1222 and the infrared sensor 124 for protecting the infrared sensor 124.

The camera module 130 includes a top lid 131, a lens barrel 132, a lens module 133, a glass cover 134, an image sensing element 135 and a lens seating 136.

The top lid 131 is a ring-shaped cover board fixed on the top of the lens barrel 132, defining an essentially round-shaped light entrance opening 1310. The light entrance opening 1310 is aligned to the camera window 103 so that light coming into the camera window 103 is incident on the lens module 133 located inside the lens barrel 132. Preferably, a protection lens 137 is disposed on the light entrance opening 1310, or alternatively the camera window 103 for preventing dusts and dirt from contaminating the lens module 133. It is understood that by properly positioning the protection lens 137, the top lid 131 can be eliminated.

The lens barrel 132 is a hollow cylinder, a part of which is inserted into and threadedly engaged with the lens seating 136 in an adjustable fashion. A distance between the lens module 133 and the image sensing element 135 can be adjusted by adjusting the distance between the lens barrel 132 and the lens seating 136 for focusing purpose.

The lens module 133 disposed in the lens barrel 132 includes three lenses spaced from each other by spacers 1335. The lens module 133 can be glued to the inner wall of the lens barrel 132 and the spacers 1335. Preferably, an infrared cut filter 1337 is disposed in the lens barrel 132 on the light path, or alternatively an infrared cut coating is formed on any one of the lenses in the lens module 133, for preventing the infrared light reflected by an object to be photographed from being incident on the image sensing element 135 and causing image noise.

The three lenses of the lens module 133 are respectively a first lens 1331, a second lens 1332 and a third lens 1333. These three lenses can be spherical or aspherical lenses. Preferably, the first lens 1331 is an aspherical convex lens, wherein an aspherical surface extends toward an object side of the first lens 1331. The second lens 1332 is disposed behind the first lens 1331, aspherical and in a similar shape as the first lens 1331. The third lens 1333 is shaped symmetrically with the second lens 1332 for eliminating aberration and improving image quality. It is understood that the number of lens in the lens module 133 is not limited to three and can be chosen based on design consideration.

The glass cover 134 is fixed to the inner wall of the lens seating 136 and disposed between the lens barrel 132 and the image sensing element 135. The glass cover 134 is configured for protecting the image sensing element 135.

The image sensing element 135, which can be a CMOS (complementary metal-oxide semiconductor) sensor or a CCD (charge coupled device) sensor, is disposed in the lens seating 136 and electrically connected to an image signal processing module 139 by a wire 138 for transmitting signals from the image sensing element 135 to the image signal processing module 139. The image signal processing module 139 is integrated on the mobile communication module 110 for processing image signals and outputting the results to the display module 140. Preferably, the image signal processing module 139 is electrically connected to the digital signal processing module 128 and can share some signal processing units therewith.

The display module 140 is electrically connected to the mobile communication module 110, disposed in an end of the housing 100 and configured for displaying the information that the mobile communication module 110 outputs. Preferably, the display module 140 is a thin-film transistor liquid crystal display (TFT LCD) module.

The multi-axial acceleration sensor 160 is integrated to the mobile communication module 110 for sensing a three dimensional linear acceleration and a three dimensional angular acceleration of the portable electronic apparatus 100 and transmitting the corresponding information to the RF module 150. The RF module 150 further transmits the information to a remote receiver. The multi-axial acceleration sensor 160 can be a six-axial acceleration sensor and manufactured by MEMS (Micro-Electro-Mechanical Systems) technology.

The portable electronic apparatus 100 can further include a micro hard disk drive 170 and an audio input device 180 such as a microphone. The micro hard disk drive 170 is disposed near the mobile communication module 110 for storing a variety of information. The audio input device 180 is disposed on a side of the housing 100 for recording audio information such as user commands.

In case that the portable electronic apparatus 100 is falling to ground or is going to collide with a hard object, the multi-axial acceleration sensor 160 can sense an abnormal acceleration and predict an impact. A signal will be sent to shut down the micro hard disk or other working objects in the portable electronic apparatus 100 before that impact happens. The portable electronic apparatus 100 is thus protected from damage.

The portable electronic device 100 is a multi-functional device. In one aspect, the portable electronic device 100 can be used as a remote control for an electronic gaming machine. Generally a main unit of an electronic gaming machine (not shown) includes an infrared light source such as an infrared light emitting diode array for emitting infrared light. The light emitted from the infrared light source is received and processed by the remote control module 120 and the result is sent back to the main unit of the electronic gaming machine by the RF module 150 to control the electronic gaming machine.

More specifically, an infrared optical signal transmitted from the infrared light source in the main unit of the electronic gaming machine is first filtered by the infrared lens 129 and then projected onto the optical lens 123 where the optical signal is focused and enhanced. The enhanced optical signal is further filtered by the infrared pass filter 126 and sensed by the infrared sensor 124. The infrared sensor 124 converts the optical signal incident thereon to an electric signal and sends the electric signal to the DSP module 128. When a user moves the portable electronic apparatus 100 in three dimensional space relative to the main unit of the electronic gaming machine, the signal that the DSP module 128 receives varies according to the position of the portable electronic apparatus 100. By processing this signal, the DSP module 128 identifies the motion that the portable electronic apparatus 100 is making and sends the corresponding information to the main unit of the electronic gaming machine through the RF module 150. By this means, the user can use the portable electronic apparatus 100 to remotely control the electronic gaming machine.

In the above embodiment, the infrared pass filter 126 in the remote control module 120 transmits light only in the infrared spectrum, eliminating the interference from light not in the infrared spectrum and improving the precision of the remote control. In addition, there is no mechanical wearing of the remote control module 120 during its operation, which improves its reliability and prolongs its usage life. Furthermore, the optical lens 123 focuses an image on the infrared sensor 124, which enhances the optical signal strength and thus further improves the precision of the remote control.

It is understood that the portable electronic apparatus 100 can also be used for remotely controlling other information processing systems such as a computer.

In another aspect, the portable electronic apparatus 100 can be used as a cell phone with which a user can dial a phone number without a keypad. For example, if a user draws an "S" in air with the portable electronic apparatus 100, meaning SOS, the multi-axial acceleration sensor 160 senses this motion and notifies the RF module 150 to dial a corresponded emergency phone number for help. As another example, when the user draws a number such as "911" in air with the portable electronic apparatus 100, the corresponded phone number 911 can be dialed. This feature provides convenience to the user especially in an emergency situation when it is not convenient or even possible to dial numbers using a keypad.

It is understood that the portable electronic apparatus 100 can be used in other applications such as a compass, a velocity meter, a step counter and so on.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A portable electronic apparatus, comprising:
- a housing;
- a mobile communication module disposed in said housing;
- a remote control module disposed in said housing, said remote control module comprising:
  - an infrared sensing module including a barrel having a light entrance opening, an infrared sensor and at least an optical element, said infrared sensor being received in said barrel and including at least an infrared pass filter, said at least an optical element being received in said barrel and disposed between said light entrance opening and said infrared sensor; and
  - a digital signal processing module electrically connected with said infrared sensor of said infrared sensing module, said digital signal processing module being configured for processing signals received from said infrared sensor and transmitting processed signals to a receiver of an object associated therewith;
- a radio frequency module electrically connected with said mobile communication module and said digital signal processing module of said remote control module, said radio frequency module being configured for receiving external radio frequency signals and transmitting information received from said mobile communication module and said digital signal processing module with radio frequency signals; and
- a multi-axial acceleration sensor integrated with said mobile communication module and configured for sensing a linear acceleration and an angular acceleration of said portable electronic apparatus when said portable electronic apparatus is moving.

2. The portable electronic apparatus of claim 1, further comprising a camera module disposed in said housing, said camera module comprising a lens seating, a lens barrel partly inserted in and engaged with said lens seating, at least one optical lens disposed in said lens barrel, and an image sensing element disposed in said lens seating.

3. The portable electronic apparatus of claim 2, wherein said camera module further comprises an infrared cut filter disposed between said at least one optical lens and said image sensing element.

4. The portable electronic apparatus of claim 1, further comprising a micro hard disk drive for storage.

5. The portable electronic apparatus of claim 1, wherein said barrel of said remote control module comprises a barrel body and a barrel seating connected therewith, said at least one optical element is disposed in said barrel body, and said infrared sensor is disposed in said barrel seating.

6. The portable electronic apparatus of claim 1, wherein said at least one optical element in said remote control module comprises at least one optical lens.

7. The portable electronic apparatus of claim 1, wherein said remote control module further comprises an infrared lens disposed in said light entrance opening or between said light entrance opening and said at least one optical element.

8. The portable electronic apparatus of claim 1, wherein said infrared pass filter of said remote control module comprises multiple oxide thin films with different refractive indexes which selectively allow light only in the infrared spectrum to pass therethrough.

9. A portable electronic apparatus, comprising:
- a mobile communication module;
- an infrared sensing module including a barrel having a light entrance opening, an infrared sensor and at least an optical element, said infrared sensor being received in said barrel and including at least an infrared pass filter, said at least an optical element being received in said barrel and disposed between said light entrance opening and said infrared sensor;

a digital signal processing module electrically connected with said infrared sensor of said infrared sensing module, said digital signal processing module being configured for processing signals received from said infrared sensor;

a radio frequency module electrically connected with said digital signal processing module, said radio frequency module being configured for receiving external radio frequency signals and transmitting information received from said digital signal processing module with radio frequency signals; and a multi-axial acceleration sensor integrated with said mobile communication module and configured for sensing a linear acceleration and an angular acceleration of said portable electronic apparatus when said portable electronic apparatus is moving.

10. The portable electronic apparatus of claim 9, further comprising a camera module, said camera module comprising a lens seating, a lens barrel partly inserted in and engaged with said lens seating, at least one optical lens disposed in said lens barrel, and an image sensing element disposed in said lens seating.

11. The portable electronic apparatus of claim 10, wherein said camera module further comprises an infrared cut filter disposed between said at least one optical lens and said image sensing element.

12. The portable electronic apparatus of claim 9, wherein said barrel of said remote control module comprises a barrel body and a barrel seating connected therewith, said at least one optical element is disposed in said barrel body, and said infrared sensor is disposed in said barrel seating.

13. The portable electronic apparatus of claim 9, wherein said remote control module comprises an infrared lens disposed in said light entrance opening or between said light entrance opening and said at least one optical element.

14. A portable electronic apparatus, comprising:

a housing;

a mobile communication module disposed in said housing;

a remote control module disposed in said housing, said remote control module comprising:

an infrared sensing module including a barrel having a light entrance opening, an infrared sensor and at least an optical element, said infrared sensor being received in said barrel and including at least an infrared pass filter, said at least an optical element being received in said barrel and disposed between said light entrance opening and said infrared sensor; and a digital signal processing module electrically connected with said infrared sensor of said infrared sensing module, said digital signal processing module being configured for processing signals received from said infrared sensor and transmitting processed signals to a receiver of an object associated therewith;

a radio frequency module electrically connected with said mobile communication module and said digital signal processing module of said remote control module, said radio frequency module being configured for receiving external radio frequency signals and transmitting information received from said mobile communication module and said digital signal processing module with radio frequency signals; and a camera module disposed in said housing, said camera module comprising a lens seating, a lens barrel partly inserted in and engaged with said lens seating, at least one optical lens disposed in said lens barrel, and an image sensing element disposed in said lens seating.

15. The portable electronic apparatus of claim 14, wherein said camera module further comprises an infrared cut filter disposed between said at least one optical lens and said image sensing element.

16. The portable electronic apparatus of claim 14, wherein said barrel of said remote control module comprises a barrel body and a barrel seating connected therewith, said at least one optical element is disposed in said barrel body, and said infrared sensor is disposed in said barrel seating.

17. The portable electronic apparatus of claim 14, wherein said remote control module further comprises an infrared lens disposed in said light entrance opening or between said light entrance opening and said at least one optical element.

18. The portable electronic apparatus of claim 14, wherein said infrared pass filter of said remote control module comprises multiple oxide thin films with different refractive indexes which selectively allow light only in the infrared spectrum to pass therethrough.

* * * * *